United States Patent
Eyl et al.

(10) Patent No.: US 11,163,543 B2
(45) Date of Patent: Nov. 2, 2021

(54) METHOD AND DEVICE FOR MANAGEMENT OF SOFTWARE MODULES AND OBJECTS

(71) Applicant: Vector Informatik GmbH, Stuttgart (DE)

(72) Inventors: Martin Eyl, Filderstadt (DE); Clemens Reichmann, Karlsruhe (DE)

(73) Assignee: VECTOR INFORMATIK GMBH, Stuttgart (DE)

( * ) Notice: Subject to any disclaimer, the term of this patent is extended or adjusted under 35 U.S.C. 154(b) by 0 days.

(21) Appl. No.: 16/837,582

(22) Filed: Apr. 1, 2020

(65) Prior Publication Data
US 2020/0319862 A1   Oct. 8, 2020

(30) Foreign Application Priority Data
Apr. 2, 2019   (DE) .......................... 102019108602.7

(51) Int. Cl.
| | |
|---|---|
| *G06F 8/41* | (2018.01) |
| *G06F 16/901* | (2019.01) |
| *G06F 8/30* | (2018.01) |
| *G06F 8/71* | (2018.01) |
| *G06F 8/75* | (2018.01) |

(52) U.S. Cl.
CPC ............... *G06F 8/42* (2013.01); *G06F 8/315* (2013.01); *G06F 8/71* (2013.01); *G06F 8/75* (2013.01); *G06F 16/901* (2019.01)

(58) Field of Classification Search
CPC .......... G06F 8/42; G06F 16/901; G06F 8/315; G06F 8/71; G06F 8/75
USPC .................................................. 717/136–167
See application file for complete search history.

(56) References Cited

U.S. PATENT DOCUMENTS

| | | | |
|---|---|---|---|
| 9,239,710 B2 * | 1/2016 | Araya ....................... G06F 8/42 |
| 9,825,976 B1 * | 11/2017 | Gomez .................. G06F 21/554 |
| 2010/0088666 A1 * | 4/2010 | Box .......................... G06F 8/42 |
| | | | 717/104 |
| 2018/0157485 A1 | 6/2018 | Kugler | |
| 2018/0357050 A1 * | 12/2018 | Brebner .................... G06F 8/38 |

(Continued)

OTHER PUBLICATIONS

Rabinovich, Maxim, Mitchell Stern, and Dan Klein. "Abstract syntax networks for code generation and semantic parsing." arXiv preprint arXiv:1704.07535 (2017).pp. 1-11 (Year: 2017).*

(Continued)

*Primary Examiner* — Satish Rampuria
(74) *Attorney, Agent, or Firm* — Hoffmann & Baron, LLP

(57) ABSTRACT

A device and a method is provided for the management of software modules and objects, in particular control units of a motor vehicle, in a database in which the objects are stored and in which at least one software module for provision of at least one function of the object, is associated with a respective object. The method includes acquiring compilable source code developed in a programming language at an operating interface for the at least one software module, generating generation of an abstract syntactic structure, in particular an abstract syntax tree, of the software module by syntactic analysis of the source code, storing the abstract syntactic structure in the database, and establishing establishment of at least one logical connection between the object and the abstract syntactic structure of the software module.

30 Claims, 4 Drawing Sheets

(56) References Cited

U.S. PATENT DOCUMENTS

2019/0004793 A1* 1/2019 Brebner ............. G06F 9/44526
2019/0095187 A1 3/2019 Benedek

OTHER PUBLICATIONS

Klint, Paul. "A meta-environment for generating programming environments." ACM Transactions on Software Engineering and Methodology (TOSEM) 2.2 (1993): pp. 176-201. (Year: 1993).*
Habermann, A. Nico, and David Notkin. "Gandalf: Software development environments." IEEE transactions on software engineering 12 (1986): pp. 1117-1127. (Year: 1986).*
Baxter, Ira D., et al. "Clone detection using abstract syntax trees." Proceedings. International Conference on Software Maintenance (Cat. No. 98CB36272). IEEE, 1998.pp. 368-377 (Year: 1998).*
https://en.wikipedia.org/wiki/Imperative_programming, "Imperative programming", downloaded from the Internet, Apr. 20, 2021,pp. 1-3 (Year: 2021).*
Salay, Rick, Shige Wang, and Vivien Suen. "Managing related models in vehicle control software development." International Conference on Model Driven Engineering Languages and Systems. Springer, Berlin, Heidelberg, 2012.pp. 383-398. (Year: 2012).*
Semenova, E. G., et al. "The software systems for managing dissimilar unmanned aerial vehicle groupings and its quality." IOP Conference Series: Earth and Environmental Science. vol. 315. No. 3. IOP Publishing, 2019.pp. 1-5 (Year: 2019).*
Tsakiris, Anthony. "Managing software interfaces of on-board automotive controllers." IEEE software 28.1 (2010): pp. 73-76. (Year: 2010).*

* cited by examiner

METHOD AND DEVICE FOR MANAGEMENT OF SOFTWARE MODULES AND OBJECTS

BACKGROUND OF THE INVENTION

The invention relates to a method for the management of software modules and objects, in particular control units of a motor vehicle, in a database, in which objects are stored and in which at least one software module for provision of at least one function of the object is associated with a respective object, and a device for the management of software modules and objects, in particular control units of a motor vehicle, wherein the device comprises a database, in which objects are stored and in which at least one software module for provision of at least one function of the object is associated with a respective object.

The managing and processing of software for, for example, control units of a motor vehicle is a complex task requiring great care. In a known database, which is marketed by the applicant under the name PREEvision, the functional requirements which are related to control units, for example, are stored as objects in the database, wherein an object can be, for example, a control unit, a functional requirement for the control unit, a documentation for the control unit, or the like. Software modules, for example, having such software which is executable by an object, are associated with such objects. Thus, for example, an item of software can be required for operating a control unit. The control unit controls, for example, a function of the motor vehicle, for example, a window regulator, and requires suitable software for this purpose, which is stored in the form of one or more software modules in the database.

However, the management of such software modules in conjunction with the objects in the database is complicated. For example, it is necessary for the source code of a respective software module to be compilable by a compiler, so that program code executable by a processor of the object results. It is advantageous if such a compilation is also possible if multiple programmers work on the source code in parallel. The version control of software is difficult to implement in this manner. Furthermore, numerous correlations exist between the objects which are depicted in the database, for example, data connections between control units, so that upon reworking of the software for one control unit, the software of another control unit is tangentially affected. One practical requirement is to image and/or maintain the consistency and/or compatibility of the software for various objects in the database.

SUMMARY OF THE INVENTION

It is therefore the object of the present invention to provide an improved method and an improved device.

To achieve the object, the method of the type mentioned at the outset is characterized by:

acquiring compilable source code developed in a programming language at an operating interface for the at least one software module, generation of an abstract syntactic structure, in particular an abstract syntax tree, of the software module by syntactic analysis of the source code, storing the abstract syntactic structure in the database, and establishment of at least one logical connection between the object and the abstract syntactic structure of the software module or a part thereof.

In the case of the device of the type mentioned at the outset, to achieve the object, it is provided that it comprises an interface for acquiring compilable source code developed in a programming language at an operating interface for the at least one software module, it comprises generating means, for example, a syntax structure generator, for generation of an abstract syntactic structure, in particular an abstract syntax tree, of the software module by syntactic analysis of the source code, it comprises storage means for storing the abstract syntactic structure in the database, and it comprises connecting means for establishment of at least one logical connection between the object and the abstract syntactic structure of the software module or a part thereof.

The device can, for example, comprise a computer or can be formed thereby. It is also possible that the device is entirely or essentially implemented by program code. The device comprises, for example, the operating interface or is designed for communication with the operating interface. The operating interface comprises, for example, an editor. The interface can be, for example, an input interface of the syntax structure generator. The syntax structure generator can communicate directly with the operating interface, for example, thus the interface for communication with the operating interface.

However, the invention can also be implemented by a computer program product having program code which contains commands executable by a processor of a device, for example, a computer. If the processor executes the commands, for example, the method according to the invention is implemented or executed.

The computer program product comprises, in one preferred variant, the mentioned database described in greater detail hereafter or is designed for communication with an external database, which does not form a component of the device according to the invention or the computer program product according to the invention. For example, the computer program product has a database interface for an external database.

The computer program product or the device preferably comprises the operating interface, in particular an editor, on which source code is processable.

The abstract syntactic structure can be a uniform structure which represents, for example, multiple logical steps or logical dependencies, for example, loops, conditions, or the like.

An ascertainment of at least two substructures of an abstract syntactic structure of a software module associated with an object and individual provision of the at least two substructures for processing at the operating interface and/or for producing at least one logical connection in each case between a respective substructure and the object is advantageously provided. It is preferably provided that multiple program lines of the source code represent a substructure in the abstract syntactic structure. For example, a branch within the abstract syntactic overall structure containing them can be provided between the substructures. Such a branch, which is ascertainable by the syntactic analysis of the source code generated by the operator, can thus be ascertained or recognized as a substructure, for example, by the computer program product or the device. Such a substructure can thus, for example, be or comprise a subprogram or a function.

It is advantageous if the abstract syntactic structure is in some sense fine-grained, i.e., it comprises multiple, for example, two or further substructures or is divided into substructures, which facilitates, for example, the processing or reworking. One substructure can in turn be subdivided into further substructures.

The at least one logical linkage can be established or exist between the object and the syntactic structure as a whole. However, it is also possible that the at least one logical linkage exists between the object and one or more substructures of the abstract syntactic structure. Multiple logical linkages are readily possible between the object or parts of the object, for example, attributes of the object, and the abstract syntactic structure as a whole or its substructures.

When a part of an abstract syntactic structure is mentioned hereafter, it is preferably a substructure. An abstract syntactic structure thus preferably consists of multiple substructures which are logically linked to one another or are logically connected.

Furthermore, it is possible that a so-called primary or fundamental abstract syntactic structure of a software module is associated with an object, which structure comprises multiple, for example, at least two, subordinate or secondary abstract syntactic structures or substructures. The primary or fundamental abstract syntactic structure is, for example, a main program, which references two subprograms or subfunctions or calls them, wherein the subprograms or subfunctions then each advantageously represent further abstract syntactic structures or are stored as such in the database.

Furthermore, multiple software modules or abstract syntactic structures or the substructures thereof of software modules can be associated with an object. The software modules or abstract syntactic structures or the substructures thereof can be connected to one another or can also be without connection to one another.

A connection is understood, for example, as a logical connection or logical linkage, a database relation, a reference, a pointer, or the like.

The abstract syntactic structure can have, for example, a tree shape. In this case, for example, substructures can be linked to one another like a tree. One substructure can comprise another substructure. Abstract in this meaning means that not every detail of the actual syntax is or will be stored, but rather the structural, content-specific details are the subject matter of the syntactic structure. For example, a condition can be syntactically represented as a node which branches into two or more branches.

The method and/or the device and/or the computer program product according to the invention comprises, for example, a so-called parser, or divider in German, which analyzes the logical structure of the acquired or input source code.

It is a basic concept of the present invention that not or not only the source code of a software module is stored in the database, which is possibly unchecked and non-compilable, but rather that an abstracted or abstract syntactic structure is formed on the basis of the source code, i.e., that a syntactically consistent abstract structure is already stored in the database and one or more logical connections are established between the object, with which the software module is associated, and the abstract syntax structure. The source code contains syntactic dependencies between its individual components, which are represented in the abstract syntactic structure in the database.

Proceeding from the at least one stored abstract syntactic structure, i.e., directly on the basis thereof, for example, program code can be generated which is executable by a processor. The program code thus contains, for example, so-called machine commands. However, it is also possible that firstly source code is generated from a stored abstract structure, from which a compiler then in turn generates program code executable by a processor. The processor which can execute the commands of the program code is, for example, a processor of the object, in particular a processor of a control unit. Thus, for example, if an abstract syntactic structure implements an opening function of a window regulator of a motor vehicle, the compiler can generate program code on the basis of the abstract syntactic structure or source code generated therefrom, which contains commands executable by a control unit of the window regulator, for example, to actuate a drive motor of the window regulator to open a window.

The compiler can represent a component of the device according to the invention or the computer program product according to the invention.

However, it is also possible that the device provides the source code at an output interface, for example, at a storage space or a data interface, for example, a network interface, and the source code can then be processed by a compiler to form program code executable by the processor of the object. The compiler does not, in this scenario, need to be a component of the device according to the invention or the computer program product or need to be directly connected to the device or the computer program product.

The method thus advantageously provides:
Generating program code having commands executable by a processor directly from the stored abstract syntactic structure or on the basis of source code generated from the stored abstract syntactic structure in a programming language and/or providing a source code for generating program code having commands executable by a processor on the basis of the abstract syntactic structure of the software module.

The following is preferably provided in the method:

generating processable source code in a programming language of the software module stored in the database or a part thereof on the basis of the at least one abstract syntactic structure associated with the software module, providing the source code for processing by an operator for the operating interface or at the operating interface acquiring the source code processed by the operator and generating a reworked abstract syntactic structure of the software module by way of syntactic analyzing of the processed source code, and storing the reworked abstract syntactic structure in the database while maintaining and/or updating the at least one logical connection between the abstract syntactic structures stored before the processing of the source code or a part thereof, in particular an abstract syntactic structure (A1, A2, A3), or a part thereof and the object.

The device according to the invention or the computer program product advantageously operate accordingly and/or have means designed for executing these steps. The device, the computer program product, and the method thus accordingly provide that source code, which is processable by an operator, is provided on the basis of the at least one abstract syntactic structure logically connected to the object. For example, the computer program product or the device has a source code generator.

For example, the source code is available at an editor, so that the operator can change, delete, or insert commands in the programming language in which the source code is written. The process source code is then acquired again, syntactically analyzed, in order to produce a new version of the abstract syntactic structure in this manner. However, this reworked abstract syntactic structure or new version of the abstract syntactic structure is then brought or held in relation with the object, i.e., while maintaining and/or updating the at least one or the multiple logical connections between the object and the original or prior syntactic structure, the reworked version of the abstract syntactic structure is stored in the database. The at least one logical connection between the object and the software module associated with it in the form of the abstract syntactic structure is thus maintained even if it is reworked, for example, at an editor. At the same time, the new or reworked version of the abstract syntactic structure is also not simply stored in the database, but rather is syntactically analyzed beforehand, so that executable program code can be generated from the new abstract syntactic structure by a processor of the object, with which the structure is associated.

For example, the logical connection between the abstract syntactic structure or its substructure and the object as a whole can be maintained. However, it is also possible that the logical connection between object and syntactic structure or its substructure is updated or maintained. Thus, for example, if a logical connection exists between a substructure of the abstract syntactic structure and the object and the position or relation of the substructure changes within the abstract syntactic structure, the connection between the substructure and the object is updated, i.e., established between the new location of the substructure and the object.

It would now be possible in principle that only the new abstract syntactic structure or the new version of the abstract syntactic structure is or will be stored in the database. However, one advantageous concept provides that multiple versions, for example, at least two versions of the abstract syntactic structure are stored. The method thus advantageously provides storing at least two versions of the abstract syntactic structure of the software module while maintaining and/or updating the at least one logical connection. The logical connection between the versions of the abstract syntactic structure and object are thus maintained or are updated, and thus refer, for example, to a different location within the reworked abstract syntactic structure.

Storing the at least two versions of the abstract syntactic structure in the form of complete abstract syntactic structures and/or in the form of a complete abstract syntactic structure and differentiating between this complete abstract syntactic structure and the respective other abstract syntactic structure is advantageously provided. For example, an original abstract structure or base structure and, proceeding therefrom incrementally, one or more changes thereof can be stored. Therefore, one or more versions of an abstract syntactic structure can be formed proceeding from a base structure on the basis of the incremental changes. It is advantageous if the program module according to the invention or the database stores an item of change information for every version. This item of change information comprises, for example, for every version, an item of information and/or which person has carried out a change and/or when the change was carried out and which change was implemented. A decremental procedure is also possible, i.e., the respective oldest or most up-to-date abstract syntactic structure is stored in the database and to ascertain or generate versions thereof, the respective differences are decrementally stored. The versioning is possible with fine granulation down to the level of the smallest syntactic structure in this case and thus the change history of every syntactic personal structure is available. The objects are also versioned using the same mechanism. The renaming of a syntactic substructure, for example, a function is only an attribute change. A new version of the function therefore also results. The change history of the function is maintained and can also be viewed by an operator beyond the point in time of the renaming. If the source code is stored solely as text, in contrast, a change history of such a function could no longer be ascertained.

This versioning advantageously also comprises the logical connections. For each logical connection, the versions of the connected objects and syntactic substructures provided at the point in time of the production are expediently stored. It is advantageously also stored for each logical connection what has developed the logical connection and/or when the logical connection was produced. It is thus recognizable, in the change history of an object or a syntactic substructure, in which version a logical connection was developed or also deleted.

The versions of a respective abstract syntactic structure are suitable, for example, for understanding changes or, for example, generating in each case suitable program code for corresponding versions of the object with which the abstract syntactic structure is associated.

Generating program code having commands executable by a processor for one of the objects on the basis of a first variant or a second variant of an abstract syntactic structure associated with the object or a part thereof is advantageously provided. Thus, for example, if the first variant is associated with a first version or variant of the object and the second variant of the abstract syntactic structure is associated with a second version or variant of the object, in dependence on the respective variant of the object, the respective variant of the abstract syntactic structure can be used to generate suitable program code. The object is, for example, a control unit of the first generation and/or of a specific producer and a control unit of the second generation and/or a different producer, which can have different hardware properties, for example, different processors, different output interfaces, or the like. The maintenance of the software proves to be extremely simple, specifically because the software as a whole or the software module as a whole is not to be redeveloped, but rather only the parts of the software in the form of the version or variant of the abstract syntactic structure matching with the object or control unit are used, which are necessary or suitable for generating the program code executable by the processor of the object. It is possible in this case to form fine-grained versions or variants of a syntactic substructure. Versions or variants can be developed of objects in the same manner. All syntactic structures associated with one version or variant are advantageously combined to form a variant set. Before generating the program code, then either the variant set or the variant of the associated object is selected to generate the corresponding variant of the program code.

It is sufficient per se to store the respective abstract syntactic structure in the database, since source code for processing by an operator or for compiling by a compiler can be generated from this structure at any time. However, storing source code produced by the operator in addition to the abstract syntactic structure produced from the source code in the database can be provided. It is thus possible, for example, that the source code developed by the operator himself, for example, which is stored in the database, and a source code which is generated by the device according to the invention on the basis of the abstract syntactic structure are provided to the operator at an editor or another operating interface. The source code developed and stored by the operator can also be stored in the database, for example, for error management and/or for documentation purposes.

For efficient and rapid generation of software, it is frequently necessary for multiple programmers to develop and/or process software for a project simultaneously. Thus, for example, software for a control unit of a motor vehicle is generated simultaneously by multiple programmers, wherein it is necessary for the software to remain consistent, i.e., for example, for parts matching with one another to be generated.

It is now possible in principle that, for example, proceeding from an object, the entire item of software associated with the object is blocked when a part of the software is processed by a programmer or operator. However, parallel processing and reworking of the software is thus not possible. One option can now provide that multiple operators or at least two operators work on source code simultaneously, from which a single abstract syntactic structure is to be generated. By way of a comparison of the source code, for example, on the basis of a comparison operation before the generation of the abstract syntactic structure, syntactic problems which have resulted due to the parallel processing of the source code can be ascertained and/or eliminated.

However, it is preferable if software inconsistencies are prevented from the beginning by a suitable blocking function. Blocking of a modifying access to the abstract syntactic structure of the software module as a whole or the part thereof provided for processing by the operator at the operating interface during the provision of the source code generated from the syntactic structure or the part thereof for processing by an operator is preferably provided. Thus, for example, conflicts during the processing by two or more operators and syntax errors in the database are to be prevented. The basic concept in this case is that the abstract syntactic structure as a whole, but preferably only parts thereof, are temporarily blocked for exclusive processing of the source code generated therefrom by in each case one single operator or programmer, wherein, however, other abstract syntactic structures or parts of the above-mentioned abstract structure remain accessible for processing by one or more other operators. Thus, for example, one substructure of the abstract syntactic structure can be respectively exclusively provided for one operator and another substructure of the abstract syntactic structure can be respectively exclusively provided for another operator, i.e., source code corresponding to the respective substructure is provided for the respective operator. These blocks are advantageously possible finely-grained for individual syntactic substructures down to the smallest ones. The parallel processing within a syntactic substructure by multiple operators is thus assisted, i.e., for example, within a function. Every block contains the information from which person and when the block was set or acquired.

Two different types of blocks are advantageously used: an exclusive block, which only one operator can possess, and a divided block, which multiple operators can possess. A very high level of parallelism in the processing of the abstract syntactic structures is thus enabled. The device according to the invention or the computer program product according to the invention expediently ascertains in dependence on processing and/or application and/or deletion of an abstract syntactic substructure by one operator, in particular automatically, the required blocks so that conflicts cannot occur in the parallel processing. It is thus also ensured that syntax errors cannot occur in conjunction with dependent abstract syntactic structures after the storage of the changed structure in the database. The abstract syntactic structures in the database are thus always compilable and after every storage of changed abstract syntactic structures in the database, the software modules can be compiled, executed, and thus tested via automatic tests. The automatic blocking of the required abstract syntactic substructure is advantageously integrated into the operating interface, i.e., into the editor, and therefore does not require any further interaction of the operator.

The at least one connection between the object and the abstract syntactic structure or substructure of the software module is preferably a bidirectional connection or relation, so that proceeding from the object, the abstract syntactic structure or substructure can be ascertained and/or determined immediately without processing effort or also, vice versa, the object can be ascertained and/or determined immediately without processing effort proceeding from the abstract syntactic structure or substructure. At an operating interface or the mentioned operating interface, for example, it can thus be retraced proceeding from the object which abstract syntactic structure or which abstract syntactic structures is or are associated with the object. It can thus be ascertained, for example, which abstract syntactic structures are to be adapted in the event of a change of the object, for example, by source code being generated on the basis of the respective syntactic structure of the changed object and being processed by an operator to implement adaptations of the software module necessary due to the change of the object. In the reverse direction, it may be retraced in the event of a change of a software module which objects and/or other software modules are affected thereby. Therefore, for example, adaptations which become necessary can also be carried out at the objects or other software modules.

It was already mentioned that one abstract syntactic structure can comprise multiple, for example, at least two abstract syntactic substructures. One preferred concept provides that not only one single connection exists in the database between an object, for example, a control unit, and an abstract syntactic structure, but rather multiple connections are provided. One preferred concept provides, for example: establishment of a first logical connection between a first part of the abstract syntactic structure of the software module and the object with which the software module is associated, and at least one second logical connection between at least one second part of the abstract syntactic structure of the software module and the object with which the software module is associated. Thus, for example, if a part of the abstract syntactic structure is changed, this part can be processed by an operator, on the basis of the source code generated from the part of the syntactic structure which is stored in the database after syntactic checking, to form a new part or a new version of the process part of the abstract syntactic structure, but while maintaining the logical connection between the object and the new or reworked part of the syntactic structure.

One advantageous measure provides identifying an abstract syntactic structure or a part thereof using a unique identifier. The unique identifier can be used, for example, to establish a connection between object and abstract syntactic structure. Of course, substructures or parts can be provided within the abstract syntactic structure, which are also each provided with a unique identifier.

The objects within the database can be of manifold nature. It is preferably provided, for example, that the objects in the database comprise control units of a motor vehicle and/or test data and/or test functions for checking the object, in particular a control unit of a motor vehicle, and/or functional requirements on an object, in particular a control unit of a motor vehicle, and/or documentation, in particular error documentation, of an object, in particular of a control unit of a motor vehicle, or are thus formed. An object is thus in other words not necessarily only a control unit within the database, but rather can also be a so-called soft object, specifically can represent, for example, a documentation of errors, properties, or the like. A test program, using which an object in the form of a control unit can be tested, can also represent or be a separate object within the database. However, an item of software or a software module does not have to be associated with every object of the database. Rather, it is possible, for example, that an item of software or at least one software module is only associated with individual objects of the database, for example, only the objects for control units and communication units, while other objects, for example, a wiring harness, are stored in the database without associated software. Multiple other objects and/or software modules can be associated with one object in the form, for example, of a control unit, i.e., corresponding connections exist between the control unit object and the other objects or software modules.

Templates are preferably stored and/or storable in the database for the objects of the database. Generating objects in the database by associating attributes with a respective object is preferably provided. For example, the name, a description, or the size and the like can be associated as an attribute with an object for a control unit. Attributes can be associated with abstract syntactic structures or substructures in the same manner. This is not possible, for example, if source code is stored as text. It can be defined via a separate configuration which attributes are additionally provided. An attribute for the life cycle of the abstract syntactic structure having various states, for example, new, checked, released, would be conceivable, for example.

Furthermore, the database preferably enables establishment of a logical connection between at least two, preferably multiple objects in the database. An operator can, for example, select the objects to be linked and logically link them to one another at an input interface on the basis of input commands, for example, by inputs of addresses, by an operating action using a mouse, or the like. The device according to the invention or the computer program product according to the invention also assists the automatic generation of logical connections. The device according to the invention or the computer program product can thus, for example, connect all changed abstract syntactic substructures to the object which represents the technical requirement automatically and/or without action of an operator. The technical requirement is in this case the cause of the change on the abstract syntactic structure by the operator.

It is possible that the source code which is syntactically analyzed to generate the abstracted syntactic structure, and a source code which is subsequently used for generating program code executable by a processor of the object are written in the same programming language, for example, C, C++, or the like. However, the invention enables a high level of flexibility with respect to programming languages. For example, generation of an abstract syntactic structure on the basis of source code developed in a first programming language and providing source code in a second programming language on the basis of the abstract syntactic structure can be provided. The operator can thus write the original source code firstly in C, for example. On the basis of this source code, an abstract syntactic structure is generated which is used as the basis for source code generated in another programming language, for example, Java, C++, or the like, for further processing by a compiler and thus for generating the program code executable by the processor of the object. The so-called common denominator of the first and second programming languages is the abstract syntactic structure.

The operating interface can represent an abstract syntactic structure or substructure in different representations for the operator. An editor of the operating interface can thus summarize thematically associated substructures from various abstract syntactic structures as a source text, for example. The thematic association can be expressed via an additional attribute at the abstract syntactic substructures. The abstract syntactic structures can be presented to the operator as a source text, as a tree, or as a UML diagram (UML=Unified Modeling Language) in the operating interface.

BRIEF DESCRIPTION OF THE DRAWINGS

Exemplary embodiments of the invention are explained hereafter on the basis of the drawing. In the figures.

DETAILED DESCRIPTION

Figure 1:
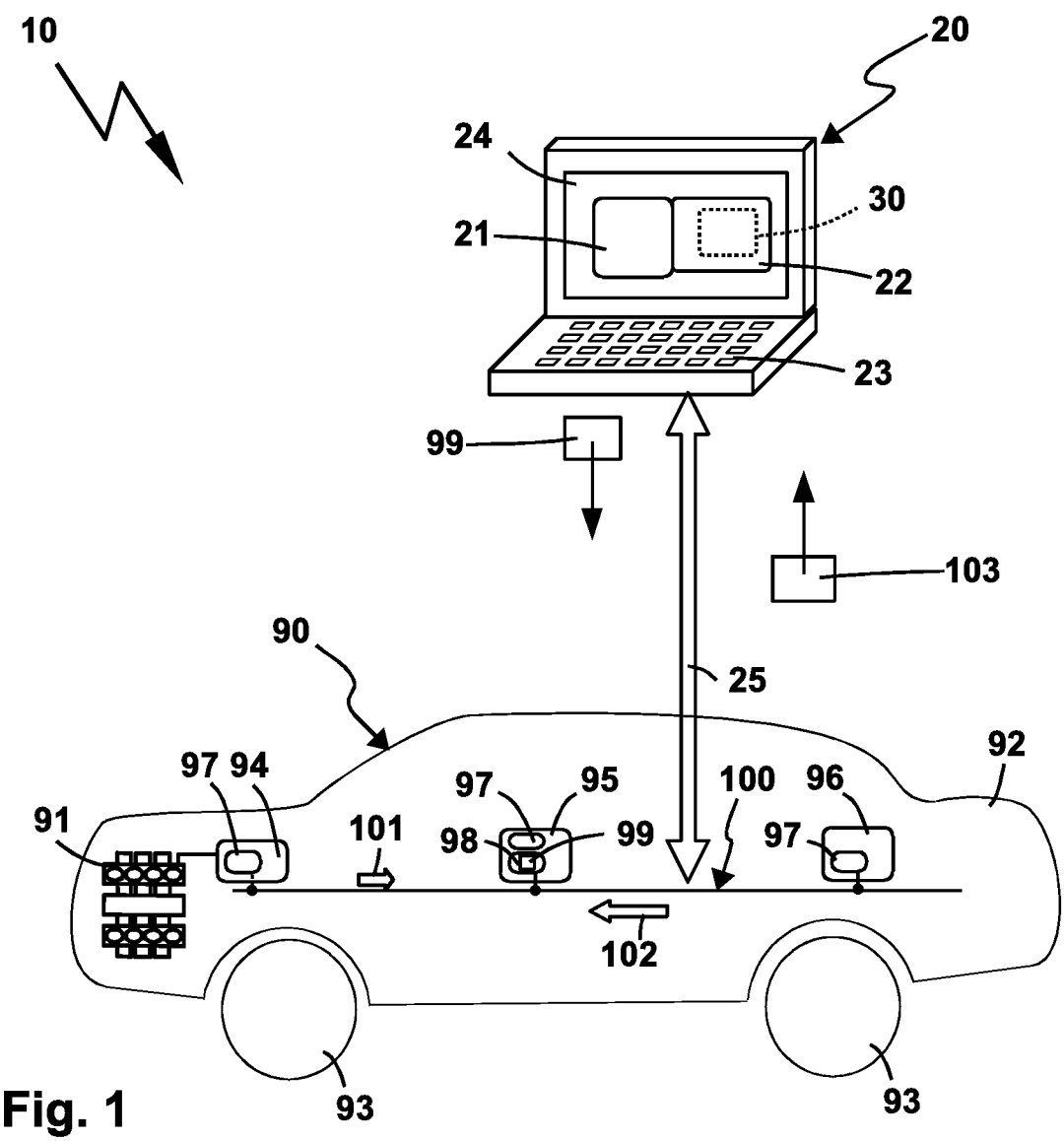
FIG. 1 shows a schematic illustration of a motor vehicle including multiple control units and a development environment for generating software for the motor vehicle.

A motor vehicle 90, for example, a passenger automobile, truck, or the like, comprises a drive motor 91, for example, an internal combustion engine, electric motor, or the like, which is arranged in a vehicle body 92 and drives wheels 93 of the motor vehicle 90.

Control units 94, 95, 96, for example, so-called ECUs (electronic control unit), are schematically illustrated for the control and/or monitoring of the motor vehicle 90, which can communicate with one another via a bus 100, for example, a CAN-Bus (CAN=Controller Area Network). Each control unit 94, 95, 96 comprises a processor 97 and a memory for storing program code executable by the processor 97. By way of example, in the case of the control unit 95, a memory 98 having a software module or program module 99 is shown. The control units 94, 95, 96 communicate with one another on the bus 100, for example, on the basis of bus messages 101, 102 and also further bus messages (not shown here).

A device 20, which forms a component of a development environment for developing software for the motor vehicle 90 and, for example, comprises a computer or is thus formed, and the motor vehicle 90 are connected to one another via a connection 25. The connection 25 is, for example, a CAN connection, WLAN connection, USB connection, or the like, via which the device 20 can transmit data, for example, the software module 99, to the control units 94, 95, 96 and preferably also can receive data from the control units 94, 95, 96, for example, an error message 103.

The device 20 comprises a processor 21 for executing program code of programs stored in a memory 22. For example, the processor 21 can execute program code of the program module 30 explained hereafter. The device 20 furthermore comprises an input interface 23, which comprises, for example, mouse, keyboard, or similar other input means, as well as output means 24, for example, a display, loudspeaker, and the like. An operator BP can develop software for the motor vehicle 90, for example, the software module 99, at the device 20.

When the device 20 is coupled to the motor vehicle 90, a system 10 thus results.

Figure 2:
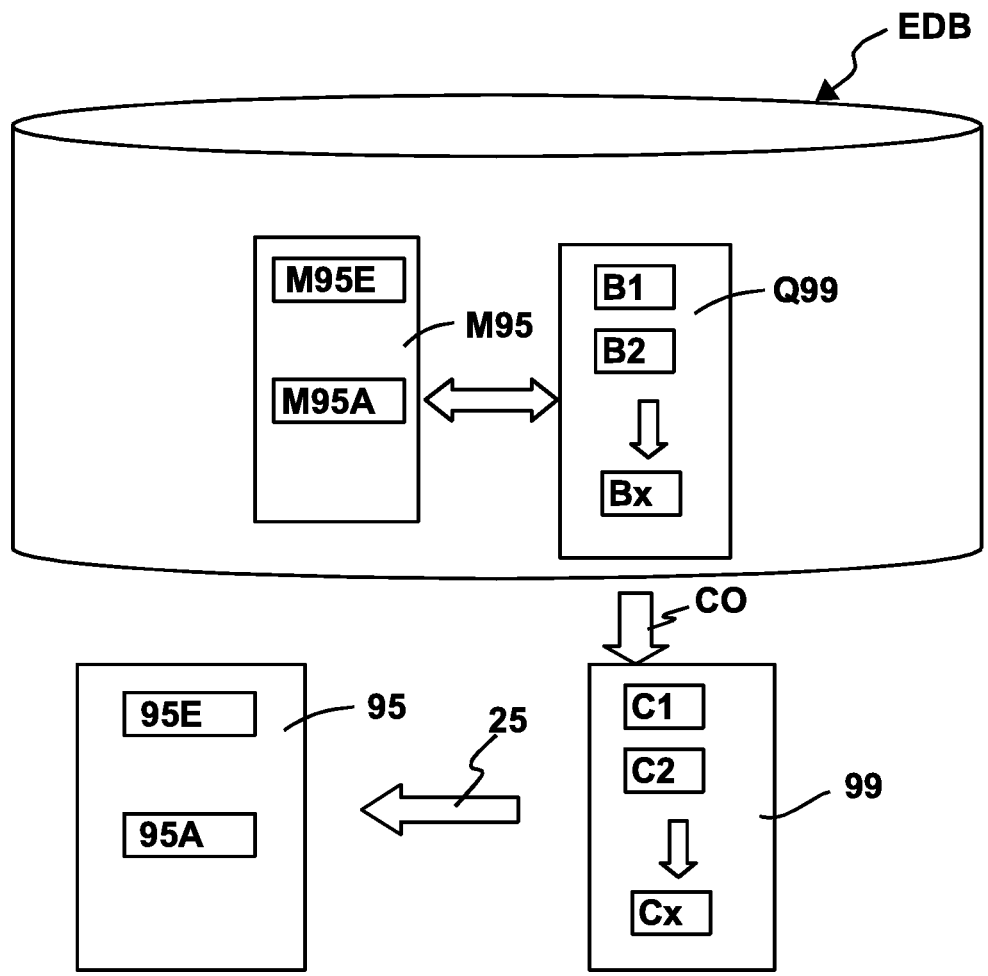
FIG. 2 shows a schematic illustration of the generation of software according to the prior art.

FIG. 2 is used to illustrate the procedure heretofore practiced for this purpose. For example, an object M95 is stored as a representation or depiction of the control unit 95 in a database EDB.

The control unit 95 comprises an input interface 95E and an output interface 95A, for example, analog and/or digital inputs and outputs. For example, a drive motor for a window regulator can be actuated via the output interfaces 95A. A respective position of the drive motor or the window thus driven can be acquired on the basis of sensors, wherein the sensors can communicate via the input interface 95E with the control unit 95. For example, attributes M95E and M95A of the object M95 are stored in the database EDB for the input interface 95E and the output interface 98A.

In relation to the control unit 95, source code Q99 for the software module 99 is stored in the database EDB, which contains, for example, program commands B1, B2, BX, which are formulated in a programming language, for example, C. The source code Q99 is compilable by a compiler CO and then contains commands C1, C2, CX, etc., which are executable by the processor 97 of the control unit 95. The device 20 can transmit the software module 99 to the control unit 95 via the connection 25, so that this control unit can provide the corresponding window regulator control.

If changes result, the source code Q99 is reworked and compiled again to generate a reworked software module 99. However, the ability to handle such a system is restricted. If the source code Q98 is not immediately compiled, but rather firstly stored in the database EDB without compiling, errors can be included which are not initially noticeable at all upon the later compiling. The handling of a known system is thus not favorable in all cases.

The program module 30 which contains the database 50 or communicates with it enables convenient handling:

An operating interface 31, for example, an editor EDB for the database 50 or parts thereof, an editor EDQ for source code, and the like is used for operating the program module 30. The operating interface 31 comprises, for example, a graphic operating interface implemented on the basis of the input interface 23 and the output means 24.

At the operating interface 31, the operator BP can generate, for example, source code Q99 for the software module 99, for example, formulate it in a manner known per se in a programming language. The source code Q contains, for example, functional components B1, B3, B2, BX, for example, functions of the software module 99, individual if-conditions, loops, and the like. The functional components B1, B2, B3 etc. can also be subprograms or callable functions, however.

One option can provide that the source code Q99 is stored in the database 50, which is schematically indicated in the drawing.

However, it is essential that the source code Q99 is syntactically analyzed by a syntax structure generator 32 and is stored in the form of an abstract syntactic structure A99 in the database 50. The database 50 is stored, for example, in the memory 22. The syntax structure generator 32 forms and/or comprises a generating means E32 for generation of an abstract syntactic structure and forms and/or comprises a storage means SP32 for storing the abstract syntactic structure, for example, the abstract syntactic structure A99, in the database 50.

The abstract syntactic structure A99 contains, for example, an abstract substructure A1, A3, A2, AX for each functional component B1, B3, B2, BX and possibly further substructures (not shown in the drawing). These substructures A1, A3, A2, AX can also be referred to as fine-grained abstract syntactic substructures, which each represent a part of the overall syntactic structure A99. The substructures A1, A3, A2, AX can be linked to one another or can also be non-linked. For example, the substructures A1, A3, A2 are linked to one another like a tree by branches.

The syntax structure generator 32 analyzes the source code Q99 in such a way that its syntactic consistency is checked. Thus, for example, if a loop programmed in the source code Q99 is not closed, the syntax structure generator 32 outputs an error message at the operating interface 31 and enables the operator BP to eliminate the error.

Figure 3:
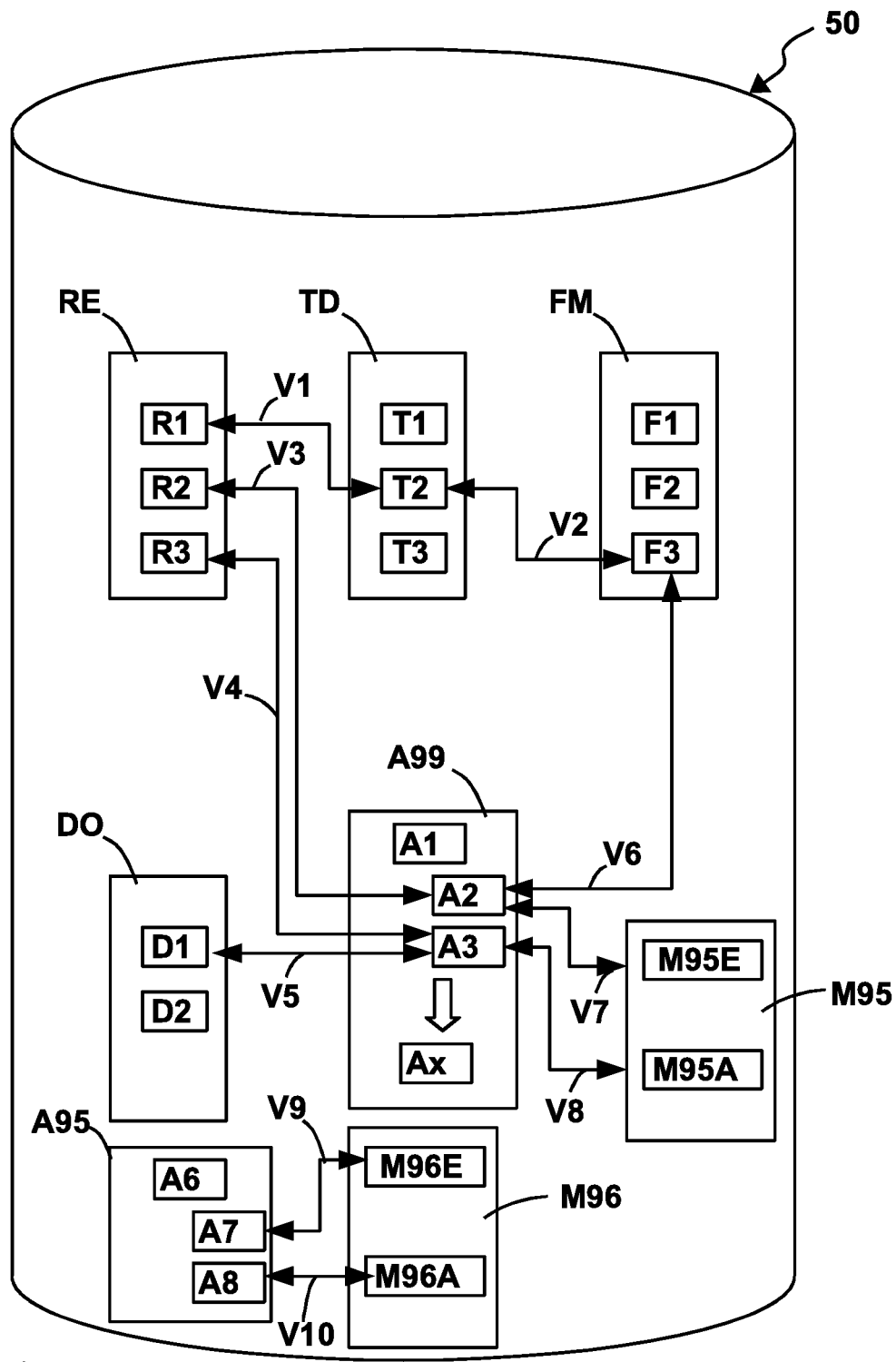
FIG. 3 shows a schematic illustration of a database
Figure 4:
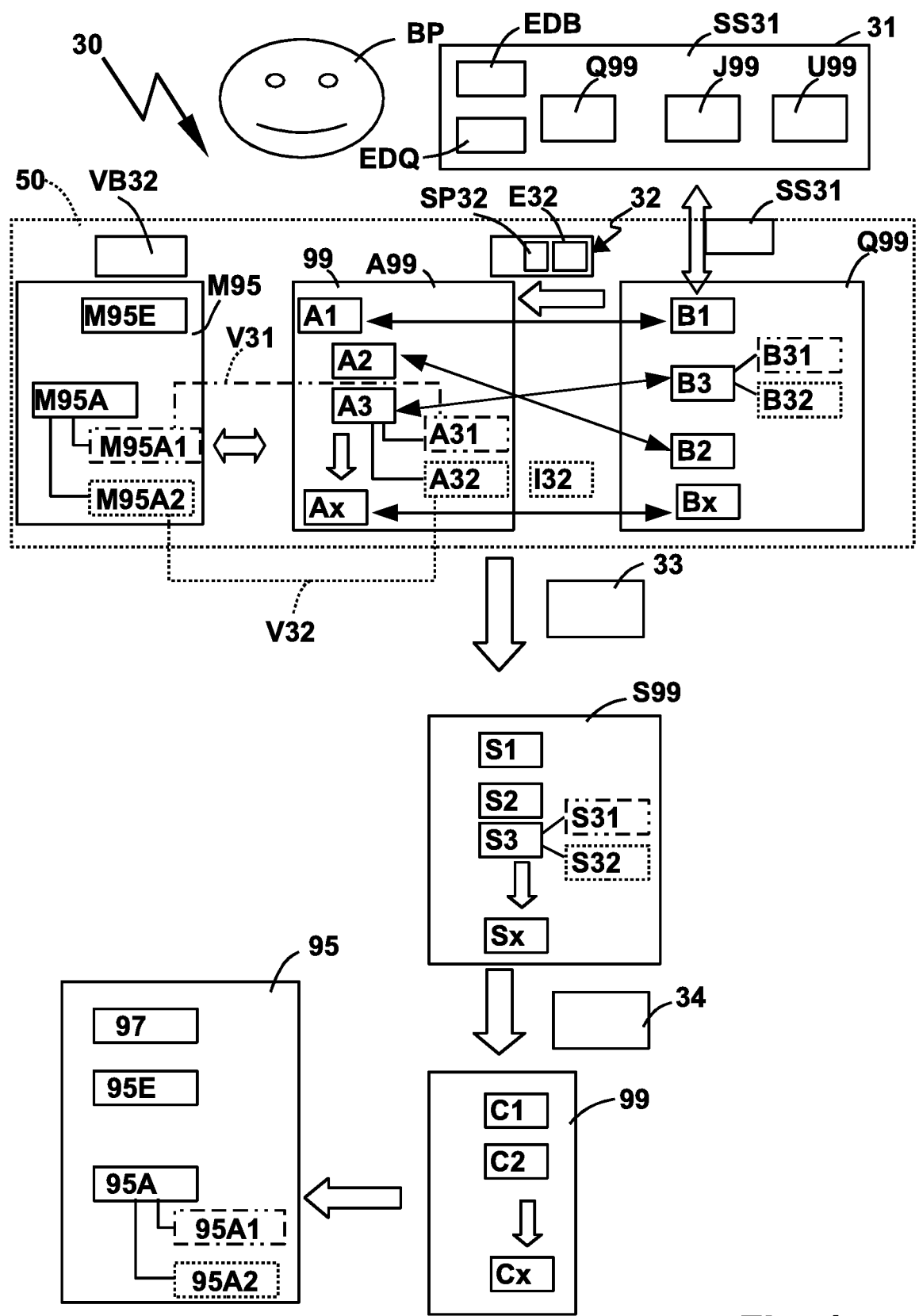
FIG. 4 shows a schematic illustration of the execution of the method according to the invention.

In the database 50, the abstract syntactic structure A99 is then associated with the model or object M95 of the control unit 95, wherein these associations will also be explained in greater detail in conjunction with FIG. 3.

The abstract syntactic structure A99 represents the software module 99 and is suitable for the immediate production thereof on the basis of a compiler 34, possibly using a source code generator 33 connected upstream of the compiler 34.

One variant can provide, for example, that compiler 34 generates the software module 99 directly on the basis of the abstract syntactic structure A99.

The source code generator 33 generates, on the basis of the abstract syntactic structure A99, source code S99, which contains, for example, functions and/or commands S1, S2, S3 . . . SX, on the basis of which the compiler 34 generates a program code executable by the processor 97 of the control unit 95. This program code contains, for example, the above-explained commands C1, C2, CX etc.

The source code generator 33 can moreover in turn generate source code on the basis of the abstract syntactic structure A99, which the program module 30 provides at the operating interface 31, so that the source code is processable by the operator 31, for example, to generate different variants of an item of software, to eliminate errors, and the like. Thus, for example, the source code generator 33 can generate, on the basis of the substructures A1, A2, A3, source code B1, B2, B3 or variants thereof for reworking and processing by the operator BP at the operating interface 31.

The source code B1, B2, B3, which the source code generator 33 provides, is preferably in the same programming language, for example, C, which the operator BP has originally used to generate the base source code. However, it is also possible that the source code generator 33 outputs this source code proposed for reworking in another programming language, for example, Java.

The maintenance and reworking of software, in particular the reworking and maintenance of a model which represents the control units 94-96 and other components of the motor vehicle 90, requirements for the software, management of errors, and the like, is significantly facilitated on the basis of the database 50 and abstract syntactic structures which are associated with the respective objects therein.

For example, a routine situation is that control units of different producers and/or generations, i.e., for example, having different hardware, different processors, and the like, are each to be supplied with software within a vehicle series. The maintenance of such software, in particular the version control and the like, is essential and is made very simple on the basis of the database 50 and/or the program module 30 as follows:

For the control unit 95, for example, different output interfaces 95A1 and 95A2 are provided, for example, for actuating different drive motors of the above-mentioned window regulator. In principle, the function of the control unit 95 remains the same, for example, with respect to sensors, the status signals, so that in different versions or variants of the control unit 95, different output interfaces 95A1 and 95A2 are provided, but the input interface 95E is identical.

For the different output interfaces 95A1 and 95A2, the operator BP can input source code modules B31 and B32 at the operating interface 31, i.e., variants of the source code or source code module B3.

Operating interface 31 communicates, for example, with an interface SS31 for acquiring compilable source code Q99 developed in a programming language at the operating interface. The interface SS31 can form a component of the operating interface 31.

The syntax structure generator 32 generates, on the basis of the source code modules B31 and B32, the alternative substructures A31, A32. The alternative substructures A31, A32 are associated or can be associated with objects M95A1 and M95A2 of the output interfaces 95A1 and 95A2. For example, logical connections V31 and V32 provided between the substructures A31, A32 and objects M95A1 and M95A2.

The operator BP can associate, for example, at the operating interface 31, the source code modules B31, B32 with the objects M95A1 and M95A2, for example, on the basis of a mouse operation, the input of names of the objects M95A1 and M95A2 etc., wherein the syntax structure generator 32 accepts such control commands and establishes the logical connections V31 and V32 between the substructures A31, A32 and objects M95A1 and M95A2. The syntax structure generator 32 therefore forms and/or comprises a connecting means VB32 for establishment of logical connections, for example, the logical connections V31 and V32.

This substructure A32 has been formed, for example, more or less originating from the substructure A31, for example, by source code having been formed from the substructure A31 and edited and reworked at the operating interface 31 to generate the substructure A32 therefrom.

An item of change information 132 is preferably stored in the database 50 for the substructure A32, which documents changes of the substructure A32 in relation to the substructure A31, for example, a point in time of the change and/or an item of information about who has performed the change and/or which changes were performed.

If the program module 30 is now supposed to generate the software module 99 for the control unit 95 in the variant having the output interface 95A1, for example, the object M95A1 is activated and/or selected, so that the source code generator 33 generates source code S31 on the basis of the substructure A31 of the abstract syntactic structure A99 as a component of the source code S99, on the basis of which the compiler 34 then generates the software module 99 in a variant suitable for the control unit having the output interface 95A1. If the output interface 95A2 is provided in the control unit 95, source code S32 is accordingly provided on the basis of the substructure A32 by the source code generator 33 to generate a corresponding alternative software module 99 for the control unit 95 in the variant having the output interface 95A2.

Multiple operators BP can use the program module 30 and the database 50 simultaneously. For this purpose, in each case a part of the data of the database 50 to be processed by a respective user is blocked or locked with respect to a usage by another user. Thus, for example, if an operator at the operating interface 31 or an operating interface parallel thereto (not shown in the drawing) of the program module 30 wishes to process source code. The source code generator 33 can thus generate, on the basis of the substructure A31, the source code B31, which can only be processed by one operator, while another operator is able to process, for example, source code B32 generated from the substructure A32 in parallel. When the processing of a respective source code B31 or B32 is completed, the syntax structure generator 32 in turn generates reworked substructures A31 and A32 or new versions thereof (not shown for simplification).

Furthermore, it is possible that the abstract syntactic structure A99 or parts thereof, for example, its substructures, for example, the substructures A31 and A32, are provided in different representations at the operating interface 31, for example, as a source text Q99 or as a UML diagram U99.

It is also possible that, for example, the source text Q99 is displayed in the programming language C at the operating interface 31 or alternatively as a source text J99 in Java.

However, further objects can also be stored in the database 50, not only models or objects for hardware or control units, for example, the control units 95 and 96. Those, for example, requirements, in particular technical requirements, software requirements, or the like, R1, R2, R3, can be stored as requirements RE in the database 50.

Test data TD, for example, individual test data T1, T2, T3, error data FM, in particular individual error data F1, F2, and F3, can also be stored in the database 50.

The requirements RE, test data TD, and errors FM can be linked to one another in a manner which is partially not shown, thus, for example, the requirements R1 and R2, but also to other objects. Thus, for example, the requirement R1 can be linked to the test data T2 and the corresponding errors or error data F3 by corresponding connections V1, V2.

Furthermore, it is possible to produce a logical linkage not only with a source code as a whole, which was possibly also possible in the prior art, but rather with its individual parts and specifically in abstract form. Thus, for example, a logical connection V3 can be established between the requirement R2 and the abstract substructure A2 and also a further logical connection V4 can be established between the requirement R3 and the abstract substructure A3.

A correlation with, for example, a documentation DO, in particular partial documentations D1 and D2, is also readily possible. Thus, for example, a partial documentation D1 is linked or can be linked to the abstract substructure A3 on the basis of a logical connection V5.

Moreover, it is possible to establish a linkage of errors which are generated, for example, by substructures of the abstract structure A99. A logical connection V6 is produced or producible, for example, between the abstract substructure A2 and the error F3 or the error series F3 in the database 50.

It is furthermore possible to also logically connect individual parts of objects, for example, the partial objects M95E, M95A of the object M95 with individual abstract substructures, i.e., not with the source code of a software module as a whole. For example, logical connections V7 and V8 are established between the abstract substructures A2 and the (partial) object M95E or the abstract substructure A3 and the (partial) object M95A, respectively.

Inter alia, an object M96 for the control unit 96 is also contained in the database 50, which also comprises attributes M96E and M96A for input and output interfaces. In the described manner, an abstract syntactic structure A95 having substructures A6, A7, and A8 of a software module (not shown in greater detail), which is executable by the processor 97 of the control unit 96, is associated with the object M96. For example, logical connections V10, V9 are established between the attributes M96E and M96A and the substructures A7 and A8.

The logical connections V1-V10 are preferably bidirectional, so that, for example, from the object of a control unit, a connection is provided to the associated abstract syntactic structure, for example, from the object M95 to the structure A99, so that proceeding from a control unit, one can find its associated software or vice versa, proceeding from an item of software, one can find with which object, for example, which control unit, which error analysis, or the like, this software is associated.

| | |
|---|---|
| 10 | 55 |
| 11 | 56 |
| 12 | 57 |
| 13 | 58 |
| 14 | 59 |
| 15 | 60 |
| 16 | 61 |
| 17 | 62 |
| 18 | 63 |
| 19 | 64 |
| 20 device | 65 |
| 21 processor | 66 |
| 22 memory | 67 |
| 23 input interface | 68 |
| 24 output means | 69 |
| 25 connection | 70 |
| 26 | 71 |
| 27 | 72 |
| 28 | 73 |
| 29 | 74 |
| 30 program module | 75 |
| 31 operating interface | 76 |
| 32 syntax structure generator (parser) | 77 |
| 33 source code generator | 78 |
| 34 compiler | 79 |
| 35 | 80 |
| 36 | 81 |
| 37 | 82 |
| 38 | 83 |
| 39 | 84 |
| 40 | 100 bus |
| 41 | 103 error message |
| 42 | 87 |
| 43 | BP operator |
| 44 | 89 |
| 45 | 90 motor vehicle |
| 46 | 91 drive motor |
| 47 | 92 vehicle body |
| 48 | 93 wheels |
| 49 | 94 control unit |
| 50 software module | 95 control unit |
| 51 | 96 control unit |
| 52 | 97 processor |
| 53 | 98 memory |
| 54 | 99 software module |

What is claimed is:

1. A method for the management of software modules and objects in a database, the method comprising:
   storing objects in a database;
   associating one software module for provision of at least one function of the object with a respective object;
   acquiring compilable source code developed in a programming language at an operating interface for the at least one software module;
   generating an abstract syntactic structure of the software module based on syntactic analysis of the source code;
   storing the abstract syntactic structure in the database;
   establishing at least one logical connection between the object and the abstract syntactic structure of the software module or a part thereof;
   generating source code that is capable of being processed in a programming language on the basis of the at least one abstract syntactic structure associated with the software module;
   providing the source code for processing by the operating interface;
   acquiring the source code processed by the operator and generating a reworked abstract syntactic structure of the software module based on syntactic analysis of the processed source code; and
   storing the reworked abstract syntactic structure in the database while maintaining and/or updating the at least one logical connection between the abstract syntactic structure of the stored software module, before the processing of the source code or a part thereof as an abstract syntactic substructure, and the object.

2. The method according to claim 1, further comprising generating program code having executable commands directly from the stored abstract syntactic structure or on the basis of source code generated from the stored abstract syntactic structure.

3. The method according to claim 2, wherein the program code is executable by a processor directly from the stored abstract syntactic structure or on the basis of a source code generated from the stored abstract syntactic structure in a programming language.

4. The method according to claim 2, wherein the program code is executable by a processor and is generated from a source code on the basis of the abstract syntactic structure of the software module.

5. The method according to claim 1, wherein the programming language is a "C" programming language.

6. The method according to claim 1, further comprising storing at least two variants or versions of the abstract syntactic structure of the software module or its substructures while maintaining and/or updating the at least one logical connection.

7. The method according to claim 6, further comprising:
   storing the at least two variants or versions of the abstract syntactic structure in the form of complete abstract syntactic structures and/or in the form of a complete abstract syntactic structure; and
   differentiating between the complete abstract syntactic structure and the respective other abstract syntactic structure.

8. The method according to claim 6, further comprising storing at least two variants or versions of the abstract syntactic substructures and at least two variants or versions of the objects in the database while maintaining and/or updating the logical connections between the variants or versions of the abstract syntactic substructures and the respective variant or version of the object associated therewith.

9. The method according to claim 8, further comprising, for at least one variant or version of the abstract syntactic substructure and/or at least one variant or version of a respective object, an item of change information is stored.

10. The method according to claim 9, wherein the item of change information comprises information about a change point in time and/or about a person who has performed the change.

11. The method according to claim 8, further comprising uniform versioning of a respective abstract syntactic substructure and the respective variant or version of the object associated therewith, so that in each case a variant of the object is associated with a variant of the substructure and/or in each case a variant of the substructure is associated with a variant of the object.

12. The method according to claim 6, further comprising generating a program code having commands executable by a processor for one of the objects on the basis of a first variant or a second variant of an abstract syntactic structure associated with the object or a part of said structure.

13. The method according to claim 1, further comprising ascertaining at least two substructures of an abstract syntactic structure of a software module associated with an object and individually providing the at least two substructures for processing at the operating interface and/or establishing at least one logical connection in each case between a respective substructure and the object.

14. The method according to claim 1, further comprising storing source code developed by the operator in addition to the abstract syntactic structure developed from the source code in the database.

15. The method according to claim 1, further comprising blocking a modifying access to the abstract syntactic structure of the software module as a whole or the part thereof provided for processing by the operator at the operating interface during the provision of the source code generated from the syntactic structure or the part thereof for processing by an operator, wherein a block can advantageously be an exclusive block for one operator or a divided block, which permits processing by a group of operators.

16. The method according to claim 1, wherein the at least one logical connection between the object and the abstract syntactic structure or its substructure of the software module is bidirectional, so that the abstract syntactic structure can be ascertained proceeding from the object and the object can be ascertained proceeding from the abstract syntactic structure.

17. The method according to claim 1, further comprising establishing a first logical connection between a first part of the abstract syntactic structure of the software module and the object, with which the software module is associated, and at least one second logical connection between at least one second part of the abstract syntactic structure of the software module and the object, with which the software module is associated.

18. The method according to claim 1, further comprising identifying an abstract syntactic structure or a part thereof using a unique identifier.

19. The method according to claim 1, wherein the objects in the database comprise control units of a motor vehicle and/or test data and/or test functions for checking the object.

20. The method according to claim 19, wherein the objects in the database comprise functional requirements on the object and/or error documentation of an object or are thus formed.

21. The method according to claim 1, further comprising generating objects and/or abstract syntactic substructures in the database by association of attributes, which can be freely configured.

22. The method according to claim 21, wherein the attributes are freely configured with a respective object and/or with abstract syntactic substructures.

23. The method according to claim 1, further comprising establishing a logical connection by a specification of an operator at the operating interface, between at least two objects and/or abstract syntactic substructures in the database.

24. The method according to claim 1, further comprising generating an abstract syntactic structure on the basis of source code developed in a first programming language and provision of source code in a second programming language on the basis of the abstract syntactic structure.

25. The method according to claim 1, further comprising providing at least two representations different from one another.

26. The method according to claim 25, wherein the at least two representations are provided as a source text and/or as a tree structure and/or as a UML diagram, of the abstract syntactic structure or parts thereof at the operating interface.

27. A device for the management of software modules and objects, in particular control units of a motor vehicle, wherein the device comprises:
   a database, in which objects are stored and in which at least one software module for provision of at least one function of the object is associated with a respective object;
   an interface for acquisition of compilable source code developed in a programming language at an operating interface for the at least one software module;
   a generating device that generates an abstract syntax tree of the software module by syntactic analysis of the source code;
   a storage device for storing the abstract syntactic structure in the database;
   a connection device for establishment of at least one logical connection between the object and the abstract syntactic structure of the software module or a part thereof; and
   at least one processor, the processor configured: to generate source code that is capable of being processed in a programming language on the basis of the at least one abstract syntactic structure associated with the software module; to provide the source code for processing by the interface; to acquire the source code processed by the operator and generate a reworked abstract syntactic structure of the software module based on syntactic analysis of the processed source code; and to store the reworked abstract syntactic structure in the database while maintaining and/or updating the at least one logical connection between the abstract syntactic structure of the stored software module, before the processing of the source code or a part thereof as an abstract syntactic substructure, and the object.

28. The device according to claim 27, further comprising an operating interface configured for communication with the operating interface.

29. A device for the management of software modules and objects, in particular control units of a motor vehicle, wherein the device comprises a processing device configured to:
   store objects in a database;
   process one software module for provision of at least one function of the object associated with a respective object;
   process compilable source code developed in a programming language at an operating interface for the at least one software module;
   generate an abstract syntactic structure of the software module based on syntactic analysis of the source code;
   store the abstract syntactic structure in the database;
   generate at least one logical connection between the object and the abstract syntactic structure of the software module or a part thereof;
   generate source code that is capable of being processed in a programming language on the basis of the at least one abstract syntactic structure associated with the software module;

provide the source code for processing by the operating interface;

acquire the source code processed by the operator and generate a reworked abstract syntactic structure of the software module based on syntactic analysis of the processed source code; and store the reworked abstract syntactic structure in the database while maintaining and/or updating the at least one logical connection between the abstract syntactic structure of the stored software module, before the processing of the source code or a part thereof as an abstract syntactic substructure, and the object.

30. A method for the management of software modules and objects in a database, the method comprising:

storing objects in a database;

associating one software module for provision of at least one function of the object with a respective object;

acquiring compilable source code developed in a programming language at an operating interface for the at least one software module;

generating an abstract syntactic structure of the software module based on syntactic analysis of the source code;

storing the abstract syntactic structure in the database;

establishing at least one logical connection between the object and the abstract syntactic structure of the software module or a part thereof;

storing at least two variants or versions of the abstract syntactic structure of the software module or its substructures while maintaining and/or updating the at least one logical connection;

storing at least two variants or versions of the abstract syntactic substructures and at least two variants or versions of the objects in the database while maintaining and/or updating the logical connections between the variants or versions of the abstract syntactic substructures and the respective variant or version of the object associated therewith; and for at least one variant or version of the abstract syntactic substructure and/or at least one variant or version of a respective object, storing an item of change information.

* * * * *